United States Patent [19]

Herring et al.

[11] Patent Number: 5,513,112
[45] Date of Patent: Apr. 30, 1996

[54] DATABASE SYSTEM

[75] Inventors: William J. Herring, Brentwood; MacKenny L. Trim, Hornchurch, both of United Kingdom

[73] Assignee: Neopost Limited, Essex, United Kingdom

[21] Appl. No.: 132,306

[22] Filed: Oct. 6, 1993

[30] Foreign Application Priority Data

Oct. 9, 1992 [GB] United Kingdom ............... 9221215

[51] Int. Cl.⁶ .................................................. G07B 17/02
[52] U.S. Cl. ............................................... 364/464.02
[58] Field of Search ........................ 364/464.02, 464.03

[56] References Cited

U.S. PATENT DOCUMENTS

| | | | |
|---|---|---|---|
| 4,377,214 | 3/1983 | Hansen et al. | 364/466 X |
| 4,420,819 | 12/1983 | Price et al. | 364/466 X |
| 4,511,793 | 4/1985 | Racanelli | 364/466 X |
| 4,752,950 | 6/1988 | Le Carpentier | 379/106 |
| 4,757,532 | 7/1988 | Gilham | 380/23 |
| 4,837,701 | 6/1989 | Sansone et al. | 364/464.03 |
| 4,907,271 | 3/1990 | Gilham | 380/25 |
| 4,941,091 | 7/1990 | Breault et al. | 364/406 |
| 4,959,768 | 9/1990 | Gerhart | 364/187 |
| 5,029,093 | 7/1991 | Wiener | 364/464.02 |
| 5,202,834 | 4/1993 | Gilham | 364/464.02 |
| 5,384,708 | 1/1995 | Collins et al. | 364/464.02 |

FOREIGN PATENT DOCUMENTS

| | | |
|---|---|---|
| 0216535 | 4/1987 | European Pat. Off. . |
| 2173738 | 10/1986 | United Kingdom . |
| 0376573 | 7/1990 | United Kingdom . |
| 2230626 | 10/1990 | United Kingdom . |

Primary Examiner—Edward R. Cosimano
Attorney, Agent, or Firm—Shoemaker and Mattare, Ltd.

[57] ABSTRACT

A database system for maintaining accounting records in relation to usage of postage meters is disclosed. The database system is provided with two computers, both of which provide access to the system from remote postage meters via a telephone network, and each computer maintains a separate database. One computer acts as primary and handles all transactions, received either direct or via the other secondary computer, and maintains a primary database. For each transaction, the primary computer creates an archived record in a buffer and periodically when the buffer is full sends an archive record to the secondary computer for use by the secondary computer to update the secondary database. In addition for critical transactions such as a postage meter recredit transaction, the primary computer also creates a transaction log and sends it to the secondary computer for storing in a FILO buffer. The primary computer lastly authorises credit to the postage meter. In the event the archived record is not sent to the secondary computer due to a fault in the primary computer, the secondary computer utilises the transaction log to update the secondary database with critical accounting data.

9 Claims, 4 Drawing Sheets

DATABASE SYSTEM

BACKGROUND OF THE INVENTION

This invention relates to dual systems for maintaining a database of records and in particular to a database system for maintaining accounting records in respect of a plurality of postage meters which have a facility for communication with a central computer system.

Communication between the central computer system and the meters is utilised for the purposes of recrediting of the meters from the central computer system and for transmitting accounting data from the meters to the central computer system. The central computer system maintains a database comprising records of accounting data in respect of each of the postage meters.

In known postage meters, the meter includes electronic accounting circuits for carrying out accounting functions in relation to usage of the postage meter in carrying out franking operations in which mail items are franked with desired values of postage charge. In so-called prepayment meters a value of credit is registered in a descending credit register and during each franking operation in which a mail item is franked, the accounting circuits carry out accounting functions in which inter alia the credit value registered in the credit register is decremented by the amount of the postage charge with which the mail item is franked. Periodically, when the value of credit registered in the credit register has been decremented to a low value, the postage meter is caused to communicate with a central computer system in a recrediting operation to enable further credit to be entered into the credit register of the postage meter to enable the meter to be used to perform further franking operations. As a part of the re-crediting operation, accounting data including the current value of credit in the descending credit register and accounting data registered in other registers of the meter is read from the registers of the meter and input to the central computer system.

Previously it has been necessary for the meter to be physically transported to the postal authority to enable postal authority personnel to read accounting data registered in registers of the meter, to reset the credit register with a new value of credit and to enter the data read from the registers and the added value of credit into a postal authority computer system. However it is preferred to carry out the register reading and recrediting of the meter remotely at the location at which the meter is used which avoids the need for physical transportation of the meter to the postal authority. The remote recrediting may be performed by use of a transportable memory module in a system which is the subject of our UK Patent 2173738. A further method of remote recrediting uses telephonic communication between the meters and the central computer. Systems for remote recrediting by telephone are the subject of our European Patent Application No. 89313220.9 (publication No. 0376573) and UK patent application No. 9127477.9 now abandoned.

It will be appreciated that it is a requirement that the risk of loss of data from the database maintained by the central computer system is extremely low. Accordingly during the course of a transaction, e.g. a recrediting operation, the accounting record for the transaction is written to a main database maintained in a non-volatile storage device, e.g. a hard disc storage device, and additionally an archive record is stored in an archive database which contains substantially the same records as the main database and is maintained independently in another memory device such as a second hard disc storage device. Also it is normal practice to make a back-up copy of the main database by regularly copying the main database to a tape streamer storage device, such back-up copy usually being made on a daily basis. If the main data base fails at any time it can be reproduced from the archives plus the last back-up. Because the main database, the archive database and the copy on tape are recorded on independent storage devices the risk of loss of data is very low.

Central computer systems provided for effecting transactions with remote devices such as postage meters are usually required to provide uninterrupted continuous service. Accordingly in order to prevent failure of the system due to any single failure it is common to duplicate the components of the system. Thus instead of a single computer, which may be a so-called personal computer, two computers are provided. Normally a first one of the computers is arranged to operate as a master or primary computer and carries out all transactions but in the event of failure of that computer, the other computer, which up to that time has been quiescent or operated in a reserve secondary capacity is caused to carry out the transactions. A difficulty then arises to ensure that the data in a database maintained by the secondary computer is up to date and corresponds to the data in the database which at the time of failure has been maintained by the first or primary computer.

If the data recorded on back-up tape is utilised to retrieve data into the database of the second computer, manual intervention is usually required and there is a break of undefined length in operation of the system while the retrieval process is effected. This is commonly known as cold standby.

An alternative is to operate the second computer in a manner which maintains the database of the second computer up to date with the data in the main database of the first computer at all times. Accordingly in the event of a failure of the first computer, the second computer is ready at any instant to take over from the first computer and to continue maintenance of the database of the second computer.

SUMMARY OF THE INVENTION

According to the invention a dual database system includes first means for entering and storing transaction records in a first database; second means for entering and storing records in a second database; said first means being operative to periodically create archive records from said transaction records and to send said archive records to said second means for entry to said second database; said second means including storage means to store a log of transaction records; said first means being operative to transmit said transaction records to said second means for storage in said transaction log storage means and said second means being operable to utilise said log of transactions to update said second database.

BRIEF DESCRIPTION OF THE DRAWING

An embodiment of the invention will now be described by way of example with reference to the drawings in which.

DESCRIPTION OF THE PREFERRED EMBODIMENT

Figure 1:
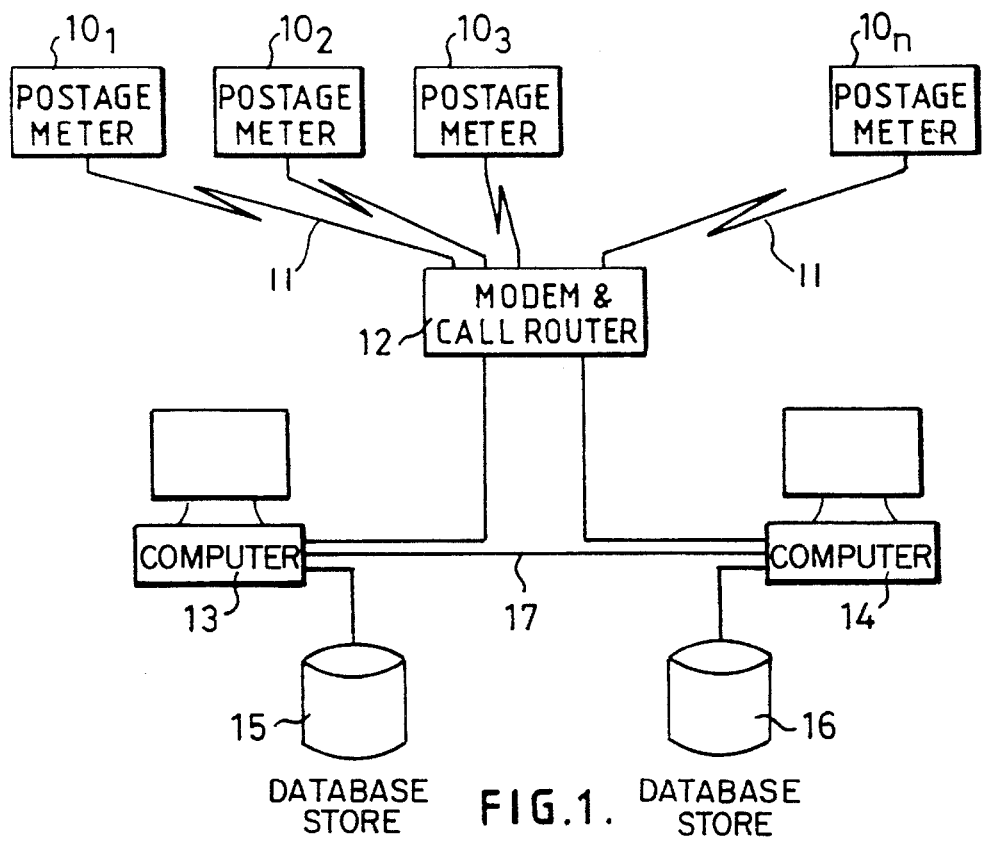
FIG. 1 shows a postage meter system including a central computer system with dual data base.

Referring to the drawings, a plurality of postage meters $10_1 \ldots 10_n$ located at users premises for use in franking mail are connectable by lines 11 of a telephone network to a modem and call router 12. The call router 12 is connected to communication ports of a first computer 13 and of a second computer 14 of a central computer system. Each computer 13 and 14 conveniently may comprise a so-called personal computer. The first computer 13 is arranged normally to operate in a primary capacity and the second computer 14 is arranged to operate in a secondary capacity. The first computer 13 includes a hard disc store 15 to be used as a non-volatile store for storing records of a primary database and the second computer 14 includes a hard disc store 16 to be used as a non-volatile store for storing archived records in a secondary database. Communication between the first and second computers 13, 14 is enabled by means of a communication link 17.

While both computers may handle communications with the remote postage meters and process transaction data received from the postage meters, only the one computer arranged to operate as the primary computer controls recording of the transaction data in the primary and secondary databases. In operation during which the first computer 13 is operated as a primary computer and the second computer 14 is operated as a secondary computer, primary database system tasks are handled by the first computer 13 and the second computer 14 after processing transactions with remote postage meters passes the processed transaction data to the first computer 13 to enable the first computer to control recording of the transaction data in the primary and secondary databases.

Figure 3:
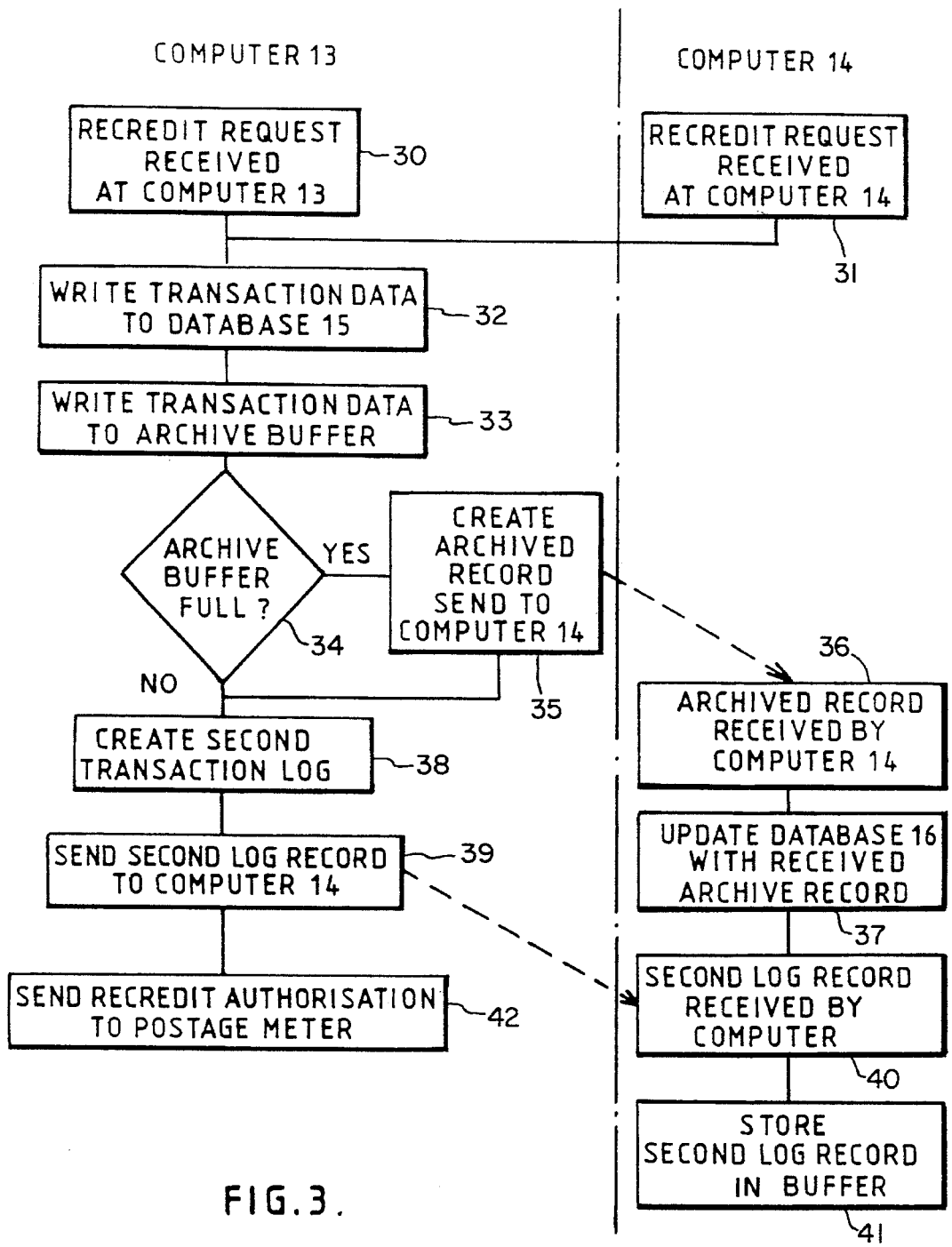
FIG. 3 is a flow chart illustrating operation of a primary computer and secondary computer of the central computer/ system.

The steps performed by the primary and secondary computers in receiving recredit requests and updating the primary and secondary databases are illustrated by the flow chart of FIG. 3.

Figure 2:
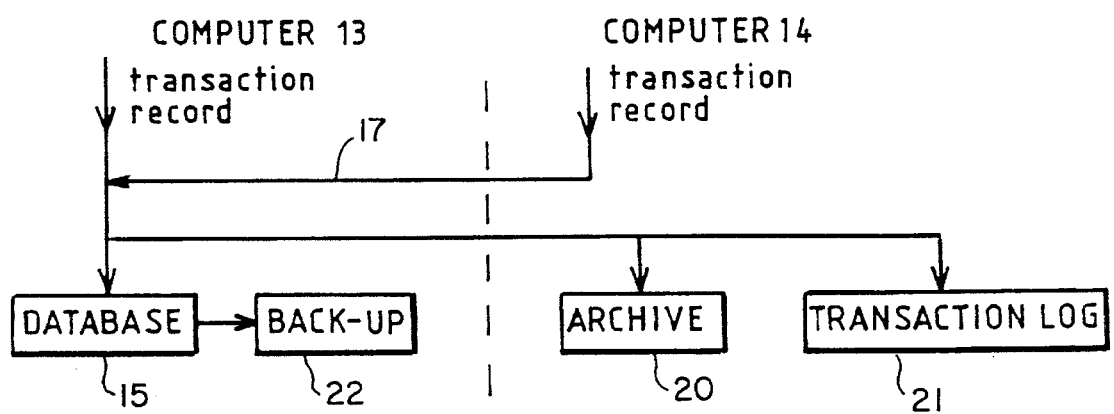
FIG. 2 is a diagram illustrating operation of the system.

As indicated in FIG. 2 and the flowchart of FIG. 3, when the first computer 13 is operating as the primary computer, records of transactions for example a recredit request received (box 30) and processed by the first computer 13 or of transactions for example a recredit request received (box 31) received and processed by the second computer 14 and received via the link 17 from the second computer 14 are written by the first computer 13 to the primary database in store 15. The first computer 13 also writes the transaction data to achieve buffer (box 33). When the achieve buffer is full (YES exit of box 34) the computer 13 creates an archived record and sends (box 35) the archived record 20 to the second computer 14 and the second computer 14. The archived record is received by the second computer 14 (box 36) is arranged to operate such as to write these received archived records to the secondary database in the store 16 of the second computer 14 to update database 16 with received archive record (box 37). Accordingly, provided any back log in writing the archived records to the secondary database is cleared, the data recorded in the secondary database corresponds completely to the data recorded in the primary database. However receiving the archived records and recording of these records in the secondary database takes a finite time and hence in general the status of the secondary database will lag that of the primary database. It is usual to provide an archive buffer which accumulates a plurality of update records. When the archive buffer is full a single archived record is created and this archived record is sent to the second computer 14 for recording in the secondary database. Accordingly there may be a substantial lag in the status of the secondary database as compared with the status of the primary database.

As a result, in the event of a failure of the first computer 13, although the second computer 14 can utilise the secondary database to provide a record of transactions the secondary database will not contain data from any transaction records accumulated in the archive buffer of the first computer 13 for which an archived record has not been created or sent to the second computer and this data would be lost.

The databases 15, 16 comprise records of account data and other less critical information relating to a plurality of postage meters and users of those postage meters. New account data is generated and needs to be written to the database each time a postage meter is recredited. In addition the other less critical information in the database may need to be amended from time to time. This less critical information may comprise, for example, addresses of users or other information which does not specifically relate to accounting for charges and payment for use of postage value by the postage meters. It will be appreciated that it is essential in order to ensure proper accounting for charging and payment in respect of use of the postage meters that all accounting data is stored in the databases and that, in the event of a failure of the computer acting as primary computer, the accounting data written to the database 16 is fully up to date or can be updated from transaction data sent to the secondary computer 14. While it is essential to maintain the accounting data accurately in both databases so that the accounting data is always available even when one of the computer systems suffers a fault, there is less need to ensure that other less critical information which may be amended from time is written to both databases.

In order to prevent possible loss of data due to any lag in updating the status of the secondary database as compared with the status of the primary database in the event of failure of the first computer 13, the first computer 13 after a determination that the archive buffer is not full (NO exit of box 34) or after sending an archived record to computer 14 (box 35) creates a second transaction log record (box 38) of any recredit transaction performed by the first computer and sends this second log record to the second computer (box 39). The second log record is received by the computer 14 (box 40) for storage in a non-volatile transaction log buffer store 21 (box 41). The second log record comprises only transaction records of critical accounting data. Accordingly, if an archived record 20 of any transaction records has not been created or has not been sent to the second computer at the time of any failure of the first computer, the second computer is able to utilise the transaction log in transaction log buffer store 21 to update the status of its secondary database in store 16 to match the status of the primary database in store 15 at the instant of failure of the first computer. It will be appreciated that when an archived record of a number of transaction records has been generated and written to the secondary database in store 16 there is no requirement to retain the transaction log in the log record in the buffer store of the secondary computer 14. Accordingly the transaction log buffer store is designed to be slightly larger, with respect to the number of transactions, than the archive buffer in computer 13 and operates in a cyclic manner such that the oldest log records are overwritten by new records. Thus the transaction log buffer always stores a log of all of the critical transaction records awaiting archiving in the archive buffer. Similarly, the records in the archive buffer are retained in the buffer only until an archived record of those records has been created and written to the secondary databases. A back-up 22 of data in the database store 15 may be provided. After the computer 13 sends the second log record to the computer 14 (box 39), the computer 13 sends a recredit authorisation to the postage meter (box 42).

Figure 5:
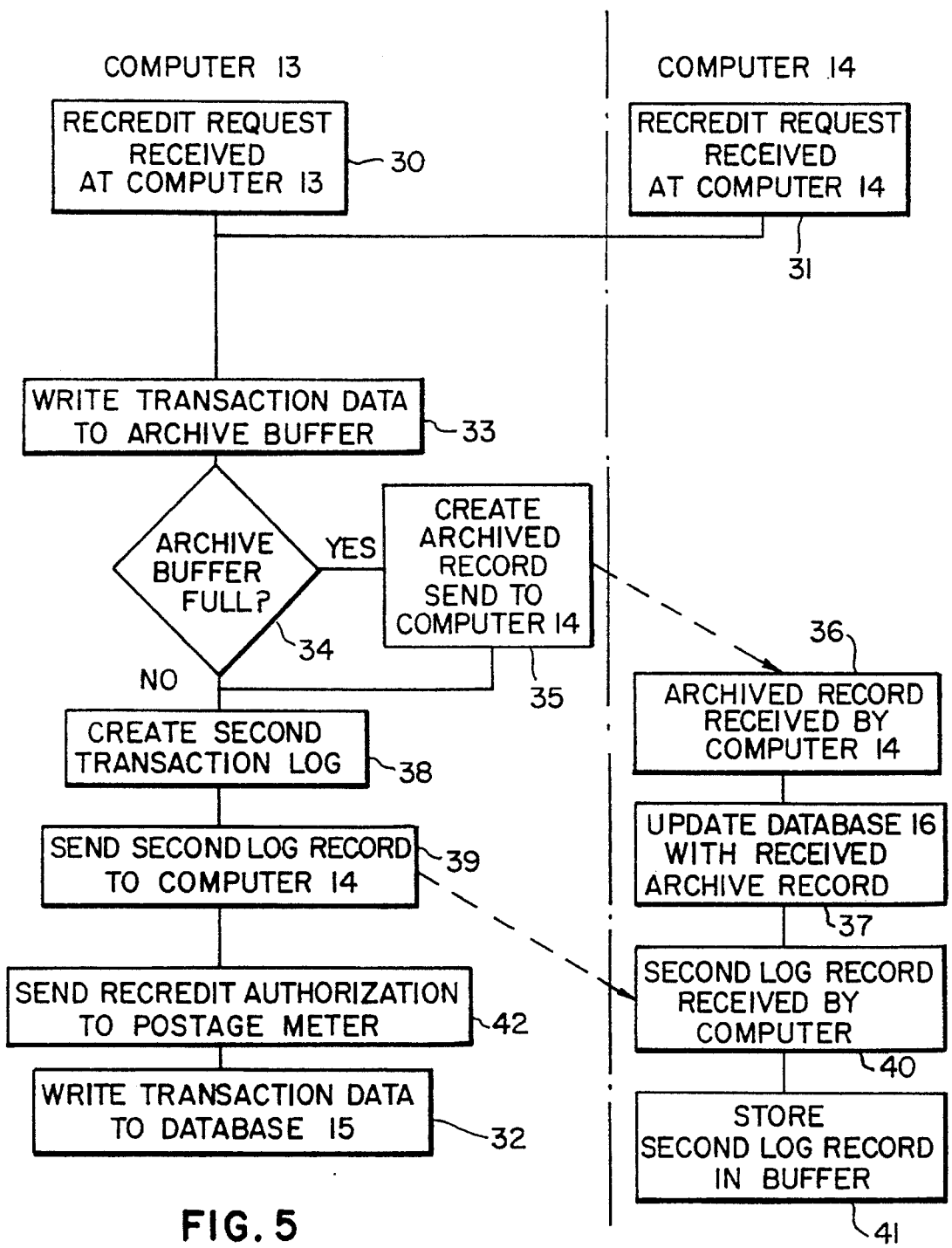
FIG. 5 is a modification of the flow chart of FIG. 4.

If desired as illustrated by the flow chart of FIG. 5 in which the same reference numerals are used as in FIG. 3 instead of carrying out the steps in the sequence illustrated in the flow chart of FIG. 3, the first computer 13, when carrying out a recrediting transaction with a remote postage meter may operate firstly to process data relating to that transaction secondly to send the transaction log data (box 39) to the second computer 14, thirdly to commit the record of the transaction to the primary database in store 15 (box 32) and lastly to send recredit authorisation to the remote postage meter (box 42).

Sending of the transaction log data to the second computer prior to committing the record of the transaction to the primary database ensures that the second computer has sufficient information to take over as primary computer even in the event that the first computer fails to commit the transaction record to the primary database. Recrediting of the postage meter is carried out as a final step in the procedure to ensure that the postage meter is unable to receive credit if the issue of that credit has not been recorded in the database. If there is a failure which results in issue of credit being recorded in the database but not transmitted to the postage meter, the system operates as described in our UK pending patent application 9127477.9 to ensure that any authorised credit which has not been issued to the meter in the course of a transaction is issued to the meter in the next succeeding transaction.

Figure 4:
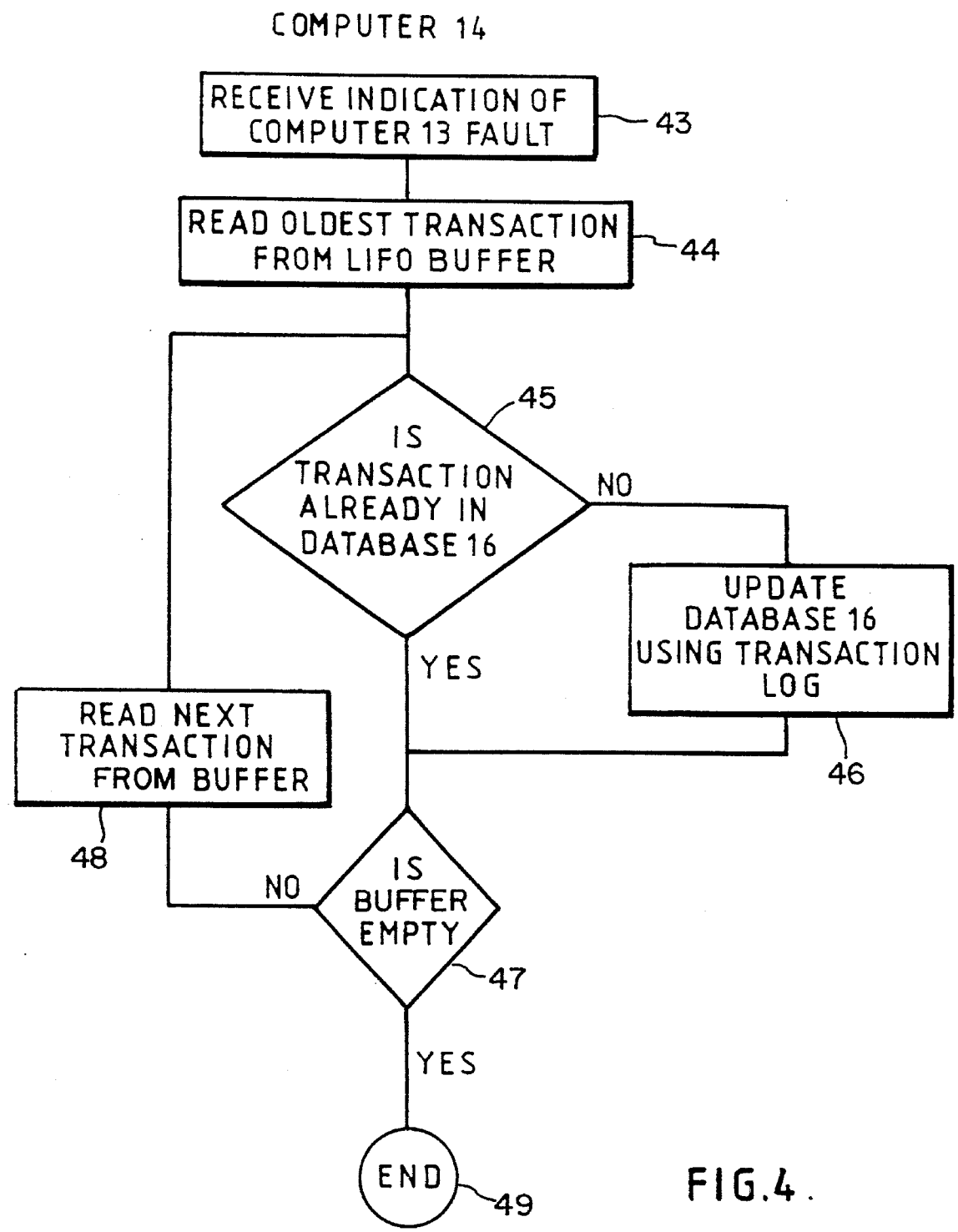
FIG. 4 is a flow chart of the operation, in the event of a primary computer fault, of the secondary computer in updating a secondary database.

In the event of a fault or failure of the primary computer 13 the secondary computer 14 receives an indication of computer 13 fault (box 43) and, as explained hereinbefore, the secondary computer 14 may not have received an archived record in respect of the most recent transactions. Accordingly the secondary computer operates, as shown in the flow chart of FIG. 4, to update the secondary database from the transaction log records stored in the transaction log buffer by reading the oldest transaction from the buffer (box 44). If the transaction is not already in the database 16 (NO exit from box 45), the computer 14 updates the database 16 (box 46). If the transaction is in the database 16 (YES exit of box 45) or the database has been updated (box 46) and if the buffer is not empty (NO exit of box 47) the computer 14 reads the next transaction from the buffer (box 48) but if the buffer is empty the routine of the flow chart of FIG. 4 is ended (box 49). Updating of the secondary database from the log records in the transaction log buffer ensures that all recredit critical records created by the primary computer prior to failure thereof are written to the secondary database. Transaction records relating to non-critical data which were written by the primary computer to the archive buffer but not sent to the secondary computer will be lost and not available for use by the secondary computer to update the secondary database. However since such data is not critical it is acceptable for this data to be recovered and written to the secondary base by manual intervention of an operator of the computer system.

In the event of failure of the first computer, the second computer 14 takes over the role of primary computer and writes transaction records to the database in the store 16. The second computer 14 also creates archived records and a log of transactions. These may be written to tape and floppy disc respectively. When the first computer becomes operational again, the database in store 16 is copied to the database in store 15 to bring the database in store 15 up to date.

The first and second computers are interchangeable in their operation, either one being capable of operating as secondary computer while the other one operates as primary computer.

The computers 13 and 14 are arranged to operate in such a manner that, in communication therebetween, either one of the computers is enabled to detect failure of the other computer so that the surviving operational computer can automatically operate as primary computer from then onwards. It will be appreciated that if the secondary computer fails, the primary computer continues to operate as primary computer and no special actions are required because it is already the primary computer and hence its database is already fully updated and has current status.

We claim:

1. A dual database system including first means for processing transactions and for writing transaction records in respect of said transactions in a first database; second means for entering and storing records in a second database to correspond to said first database; said first means being operative to create an archived record from a group of said transaction records and to send said archived record to said second means; said first means being operative to create a transaction log record in respect of each transaction relating to critical information and to transmit each said transaction log record to said second means; said second means including transaction log storage means and being operative to store received transaction log records in said transaction log storage means; said second means being operative to update said second database from said archived record sent by said first means and received by said second means; and said second means being operable in response to failure of said first means to send an archived record in respect of new transactions processed by said first means immediately prior to said failure of said first means to utilise said transaction log records stored in said transaction log storage means to update said second database in respect of each transaction record relating to critical data of said new transactions so that the second database contains records of all transactions relating to critical information processed by said first means.

2. A system as claimed in claim 1 wherein the operations performable by the first and second means are interchangeable.

3. A system as claimed in claim 1 wherein in the event of a failure of said first means the second means is operative to enter transaction records into the second database.

4. A dual database system as claimed in claim 1 wherein said first means is operable to recredit selected postage meters of a plurality of postage meters and in each recrediting operation the transaction relates to the critical information.

5. A dual database system as claimed in claim 1 wherein said first means and said second means are operable to recredit selected postage meters of a plurality of postage meters and to create transaction records of recrediting operations; and wherein said second means is operative in a recrediting operation to transmit the transaction record created by said second means to said first means to enable said first means to enter said transaction record in said first database.

6. A dual database system as claimed in claim 1 wherein said first means is operative to send said transaction log record to said second means prior to entry of said transaction record into the first database.

7. A system as claimed in claim 6 wherein the operations performable by the first and second means are interchangeable.

8. A system as claimed in claim 1 including a plurality of remote devices; communication means to provide communication between said remote devices and the first and second means said first and second means being operative selectively to generate a new first transaction record relating to communication with a respective one of said remote devices; said second means being operative to send the transaction records to said first means and said first means being operative to create the archived record of transaction records generated by the first means and of transaction records generated by the second means.

9. A dual database system as claimed in claim 8, wherein the remote devices comprise postage meters.

* * * * *